Sept. 23, 1958 K. DAVEY 2,853,321
STUFFING BOX SEAL WITH AN AUXILIARY STATIC SEAL
Filed June 29, 1955
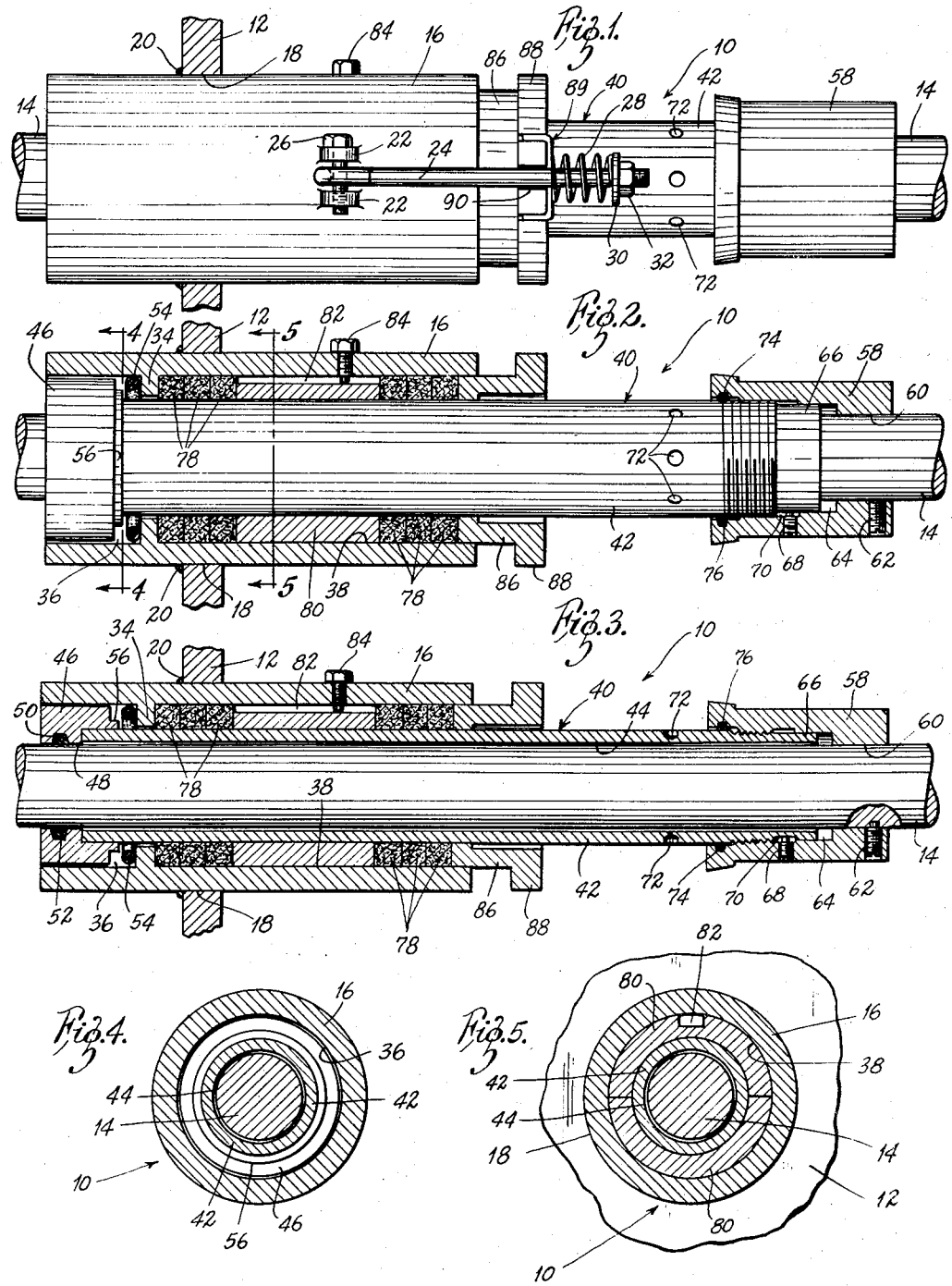
INVENTOR:
KINGSLEY DAVEY,
BY Kingsland, Rogers & Ezell
ATTORNEYS United States Patent Office 2,853,321
Patented Sept. 23, 1958

2,853,321

STUFFING BOX SEAL WITH AN AUXILIARY STATIC SEAL

Kingsley Davey, Brentwood, Mo.

Application June 29, 1955, Serial No. 518,811

6 Claims. (Cl. 286—7)

The present invention relates generally to improvements in stuffing boxes. More specifically, it relates to a novel stuffing box arrangement which incorporates means for effecting and maintaining a fluid-tight seal during replacement of packing elements in the stuffing box.

Briefly, the invention recognizes the problem that is not infrequently presented in connection with liquid containers provided with stirring or agitating devices where the power shaft passes through the wall of the tank and where a stuffing box is utilized to prevent leakage of fluid along the shaft. The problem in such an arrangement is, of course, that of periodic replacement of the packing materials without resort to draining the container of its liquid in order to prevent leakage of fluid during the replacement operation. Thus, the invention hereinafter described teaches the use of a sleeve assembly disposed over the shaft where it passes through the stuffing box. This sleeve assembly, which normally turns with the shaft, includes conventional means for maintaining a static seal between the sleeve and the shaft, and, at the same time, provides a cylindrical wearing surface for rubbing engagement with the packing in the stuffing box. When the shaft is at rest, the sleeve assembly may be shifted axially so as also to effect a static seal with the stuffing box and thus to prevent leakage therethrough when the packing is removed for replacement.

It is an object of the invention, therefore, to provide a novel stuffing box arrangement which incorporates static seals for preventing leakage of fluids through the stuffing box when the packing is removed for replacement.

It is another object of the invention to provide a novel stuffing box arrangement which includes a shiftable element for effecting a static seal for preventing leakage through the stuffing box when the packing is removed for replacement.

It is another object of the invention to provide a novel stuffing box arrangement which incorporates a shiftable sleeve member for rubbing engagement with the packing of the stuffing box and for effecting a static seal during replacement of the packing.

It is another object of the invention to provide a novel stuffing box arrangement which utilizes O-rings for effecting a static seal during replacement of the packing material in the stuffing box.

The foregoing, along with other objects and advantages, will be apparent from the following description of a specific embodiment of the invention as illustrated in the accompanying drawing, in which:

Figure 1 is a side elevational view of a stuffing box arrangement conforming to the teachings of the present invention, the arrangement incorporating a rotatable shaft, shown fragmentarily, and being mounted in a tank wall, shown in section;

Figure 2 is a partial sectional view taken from the same position as Figure 1 and showing a sleeve assembly in elevation;

Figure 3 is a full sectional view similar to Figure 2, but showing the sleeve assembly also in section;

Figure 4 is a vertical sectional view taken generally along the line 4—4 of Figure 2; and Figure 5 is a vertical sectional view taken generally along the line 5—5 of Figure 2.

Referring to the drawings more particularly through use of the reference characters placed thereon, the numeral 10 designates generally a stuffing box arrangement constructed in accordance with the teachings of the present invention. The arrangement 10 is incorporated in a side wall 12 of a tank or other container adapted to hold liquid. The purpose of the arrangement 10 is, of course, to provide a non-leaking passage for a rotatable shaft 14 to extend through the wall 12 into the interior of the tank. Thus, as clearly illustrated in the drawing, a cylindrical stuffing box 16 is extended through a hole 18 in the tank wall 12 and non-leakingly secured therein by welding 20. Figure 1 of the drawing shows the outside of the stuffing box 16 to be provided with spaced lugs 22 for pivotally mounting an elongated eyebolt 24 on a screw 26. Preferably, eyebolts 24 with mounting elements 22 and 26 are provided at no less than two points equally spaced around the periphery of the stuffing box 16. Hence, it will be understood that the depicted arrangement 10 incorporates a second eyebolt 24 which is not visible in the drawing. Each of the eyebolts 24 mounts a compression spring 28 retained by a washer 30 and a nut 32 for a purpose to appear.

The hollow interior of the stuffing box 16 is generally cylindrical, except for an inwardly extending annular flange 34 which, in effect, demarcates between a sealing chamber 36 and a packing chamber 38.

A sleeve assembly 40 includes an elongated tubular wear sleeve 42 having a central bore 44 which is slightly larger than the outside diameter of the shaft 14. A collar 46 is secured, as by press-fitting, to one end of the wear sleeve 42 as illustrated in Figure 3, and this collar 46 has a bore 48 sized for smooth sliding engagement with the shaft 14. An annular groove 50 formed in the bore 48 accommodates an O-ring 52 capable of sealing off liquid that would otherwise flow between the shaft 14 and the collar 46. Obviously, means other than an O-ring may be employed for providing a seal between the shaft 14 and the collar 46; for example, the collar could be counterbored to receive chevron rings or the like which would be retained by a suitable washer or gland secured to the end of the collar.

As is clear from the drawing, the wear sleeve 42 with the integral collar 46 is disposed concentrically over the shaft 14 so that the collar 46 is accommodated within the aforementioned sealing chamber 36. Thus disposed, the collar 46 is in position to retain an O-ring 54 in a position adjacent the inwardly extending annular flange 34. The end of the collar 46 which is adjacent the O-ring 54 is relieved around its outside edge so as to leave a ledge or groove 56 shaped to compress the O-ring 54 against the interior of the stuffing box 16, as will appear.

The end of the wear sleeve 42 which is remote from the collar 46 is threadedly received in an elongated slinger collar 58 having a bore portion 60 which fits snugly upon the shaft 14. A setscrew 62 prevents relative movement between the slinger collar 58 and the shaft 14. Preferably, the slinger collar 58 is formed with a counterbore 64 which receives a finished end portion 66 of the sleeve 42 in smooth sliding engagement. A dog screw 68 threadedly inserted in the slinger collar 58 extends inwardly so as to engage an elongated slot 70 provided in the sleeve 42. It is evident, then, that the collar 58 is secured for rotation with the shaft 14 and, further, that the sleeve 42 will rotate with the collar 58. It will be observed still further, however, that the sleeve 42 and the collar 46 attached thereto can be adjusted axially of the shaft 14 by removing or loosening the dog screw 68 and screwing the sleeve 42 into or out of the slinger collar 58. Circumferentially spaced wells 72 are provided for cooperation with a conventional spanner wrench in adjusting the sleeve 42. An inner annular groove 74 formed at the sleeve receiving entrance of the collar 58 accommodates an O-ring 76 which engages the exterior of the sleeve 42.

Conventional resilient packing material is disposed in the packing chamber 38 in the annular space between the wear sleeve 42 and the wall of the stuffing box 16. This packing may be in bulk form, in rope form for coiling around the sleeve 42, or, as here illustrated at 78, in the form of split rings. Preferably, the rings 78 are divided into two groups which are spaced apart by a bushing 80 having a longitudinal slot 82 which receives the end of a screw 84 to prevent it from rotating with the shaft 14 and the sleeve assembly 40. The bushing 80 is preferably constructed of a suitable bearing metal, such as bronze. A packing gland 86, preferably of conventional split construction, fits against the outermost packing ring 78, as illustrated, for compressing the packing within the stuffing box 16. The gland 86, the two halves of which are held together by conventional keepers 89, has an outer flange 88 provided with grooves or notches 90 for receiving the eyebolts 24 that the springs 28 may bear against the gland 86 and thus effect the aforementioned compression of the packing.

In use, the arrangement 10 serves efficiently to prevent leakage along the shaft 14, both when the latter rotates in normal operation and when it becomes necessary to replace the packing rings 78. Considering first the normal operative condition, in which the shaft 14 rotates continuously, it will be evident as above mentioned that the sleeve assembly 40 rotates with the shaft 14. As also mentioned previously, the O-ring 52 is effective to prevent appreciable liquid flow between the relatively static shaft 14 and collar 46. It is clear then that the siding or rubbing seal is effected between the outside of the wear sleeve 42 and the packing rings 78 which are compressed around the sleeve 42 by the spring 28 acting through the packing gland 86. This is the condition illustrated in the drawing.

When it becomes necessary to replace the packing rings 78, the procedure is to withdraw the dog screw 68 from the groove 70, whereupon a spanner wrench may be inserted into the wells 72, and the wear sleeve 42 may be screwed into the slinger collar 58. This effects an axial movement of the wear sleeve 42 and collar 46 relative both to the shaft 14 and to the stuffing box 16. As a result of this movement, the portion 56 of the collar 46 is moved into engagement with the O-ring 54 so as to compress the latter firmly into the corner between the outer wall of the sealing chamber 36 and the inwardly extending flange 34. The resulting seal established at this point then enables the gland 86, the packing rings 78, and the bushing 80 all to be removed from the stuffing box 16 without danger of liquid leakage therethrough. Attention is directed to the spacing of the slinger collar 58 from the adjacent end of the stuffing box 16, it being apparent that ample room is provided for accommodation of the bushing 80 during replacement of the rings 78 disposed inwardly thereof.

When all of the rings 78 have been replaced, the sleeve assembly 40 is once more returned to the condition illustrated in the drawing in preparation for resumed operation of the shaft 14.

Clearly, there has been provided a stuffing box arrangement which fulfills the objects and advantages sought therefor.

It is to be understood that the foregoing description and the accompanying drawing have been given only by way of illustration and example. It is further to be understood that changes in the form of the elements, rearrangement of parts, or the substitution of equivalent elements, all of which will be obvious to those skilled in the pertinent art, are considered to be within the scope of the present invention, which is limited only by the claims which follow.

What is claimed is:

1. In a stuffing box arrangement for a rotatable shaft, the combination of stationary tubular means encompassing a portion of the shaft, a sleeve axially shiftably disposed over said portion of the shaft within the tubular means, means for selectively securing said sleeve for rotation with said shaft, means for effecting a static seal between said sleeve and said shaft, means effecting a sliding seal between said sleeve and the tubular means, and means effective upon displacement of said sleeve relative to said shaft for establishing a static seal between said sleeve and the tubular means.

2. In a stuffing box arrangement for a movable shaft, an elongated tubular stuffing box concentric with said shaft, an integral inwardly extending annular flange on the stuffing box, a sleeve disposed for axial movement upon said shaft within the stuffing box and extending axially in both directions beyond said flange, a fixed flange on the sleeve extending radially outwardly therefrom in spaced parallel and opposing relation to one side of the inwardly extending flange of the stuffing box, first sealing means disposed between said sleeve and said shaft, second sealing means interposed axially between said flanges, third sealing means on the other side of the inwardly extending flange and disposed between said sleeve and said stuffing box, and means spaced axially beyond said third sealing means for controllably shifting said sleeve axially of the stuffing box so as selectively to establish and disestablish a fluid seal at the second sealing means, said shifting means including a slinger collar secured to the shaft, said slinger collar having a counterbore therein for slidably receiving an end of the sleeve, and means for retaining the sleeve in fixed relation to the slinger collar.

3. The combination of claim 2 wherein the sleeve and the slinger collar are in threaded engagement, and wherein a dog screw in the slinger collar removably engages a slot in the sleeve.

4. The combination of claim 3 wherein the slinger collar is provided with an internal groove, and an O-ring disposed in said groove in sealing engagement with the sleeve.

5. In a stuffing box arrangement for a rotatable shaft, the combination of a stationary tubular element encompassing a portion of the shaft, a sleeve disposed over said portion of the shaft within the tubular element, said sleeve being longitudinally shiftable upon said shaft, means for selectively securing said sleeve for rotative movement with said shaft, a resilient sealing ring interposed between said sleeve and said shaft for effecting a static seal therebetween, there being an annular groove in said sleeve for retaining said ring, replaceable packing means interposed between said sleeve and said tubular element for effecting a sliding seal therebetween, and compressible sealing means responsive to longitudinal displacement of said sleeve relative to said shaft for effecting a static seal between said sleeve and the tubular element.

6. The combination of claim 5 wherein the tubular element is provided with an integral inwardly extending radial flange, wherein the compressible sealing means for effecting a static seal between said sleeve and the tubular element includes a resilient sealing ring disposed within said tubular element against said flange, and wherein the sleeve is provided with a radially outwardly extending shoulder for radially compressive engagement with the last-mentioned sealing ring upon longitudinal displacement of the sleeve relative to the shaft.

(References on following page)

References Cited in the file of this patent

UNITED STATES PATENTS

| | | |
|---|---|---|
| 675,019 | Saxton | May 28, 1901 |
| 1,404,712 | Binder | Jan. 24, 1922 |
| 1,486,161 | Ross | Mar. 11, 1924 |
| 1,667,992 | Sherwood et al. | May 1, 1928 |
| 2,306,417 | Weissner | Dec. 29, 1942 |
| 2,534,530 | Perry et al. | Dec. 19, 1950 |
| 2,612,391 | Boutros | Sept. 30, 1952 |

FOREIGN PATENTS

| | | |
|---|---|---|
| 679,379 | Germany | Aug. 4, 1939 |